Dec. 1, 1964   J. SCHUITEMAKER   3,159,296
TRAILER PROVIDED WITH A CONVEYOR
Filed Sept. 6, 1961   3 Sheets-Sheet 1
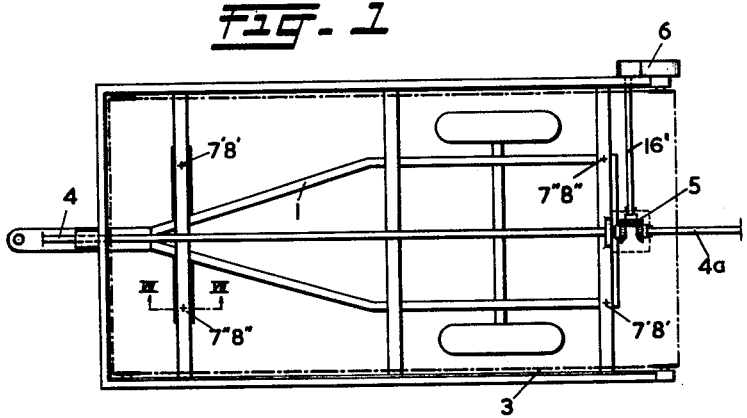
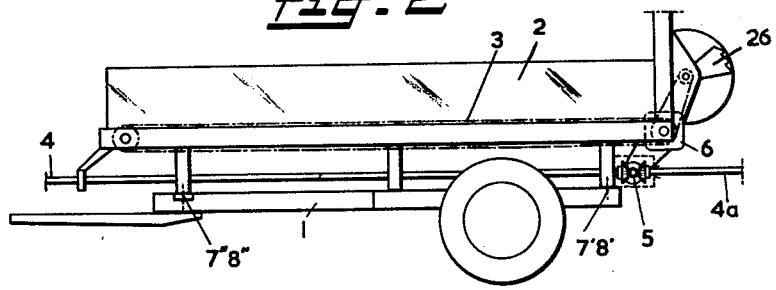
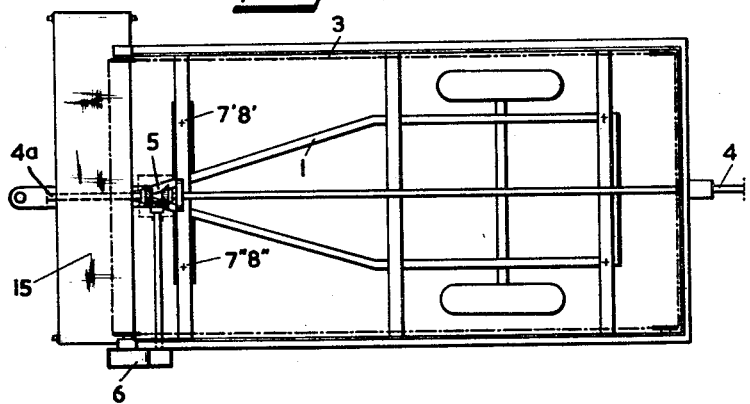

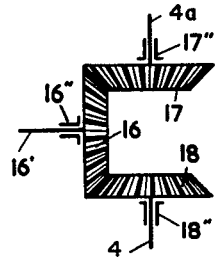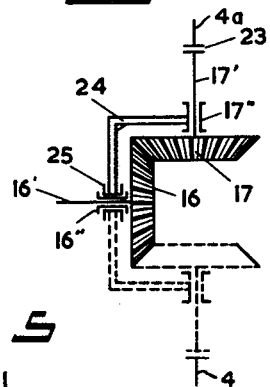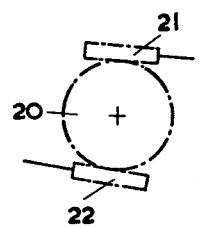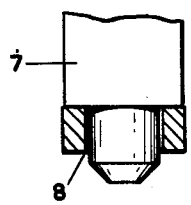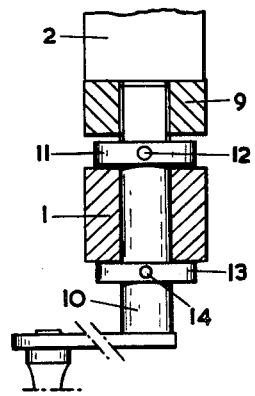

United States Patent Office 3,159,296
Patented Dec. 1, 1964

3,159,296
TRAILER PROVIDED WITH A CONVEYOR
Johannes Schuitemaker, Wierden, Netherlands, assignor to Schuitemaker Patenten N.V., Wierden, Netherlands, a corporation of the Netherlands
Filed Sept. 6, 1961, Ser. No. 136,274
Claims priority, application Netherlands Sept. 19, 1960
9 Claims. (Cl. 214—519)

This invention relates to a trailer for use with a tractor, said trailer comprising a platform, a conveyor on said platform, at least one auxiliary device at at least one end of said platform, as well as a transmission mechanism, via which mechanism said conveyor and said auxiliary device are driven by the tractor engine.

In known trailers of this type unloading only takes place at one end. In actual practice, however, it is necessary for the material on the platform to be unloaded sometimes at the rear end and sometimes at the front end, while often the conveyor on the trailer is to cooperate with an additional conveyor for carrying off the material in transverse or longitudinal direction relative to the trailer or another auxiliary device, such for example as a rotating distributor, to which the material is supplied by the conveyor on the trailer platform.

Of course it is possible to have the load move in the opposite direction by reversing the direction of movement of the conveyor, but to this measure the drawback attaches that also at the front end of the trailer an opening must be provided, in which case there are two openings that are so constructed in such a manner that they can be closed.

If in that case the conveyor, for example, is in the form of an endless belt, a secondary drawback is that the pulling run of the belt will be located at the lower side unless a double drive is provided, which entails complications and additional expense.

According to the invention these objections are eliminated if the transmission mechanism is adapted to be driven from each end of the trailer by a tractor engine take-off shaft having only one direction of rotation, the arrangement being such that the output shaft of the transmission mechanism always rotates in one and the same direction relative to said platform.

In general it is of importance for the weight of the trailer to rest as much as possible on the tractor wheels, this being the reason why preferably two-wheeled trailers having their wheels located near the rear end of the trailer are used.

This need not be changed when applying the invention if the platform together with the transmission mechanism and the drive gear connected thereto are mounted for rotation about a vertical axis through approximately 180°, relative to the chassis of the trailer, which naturally is also possible in the case of four wheeled trailers, and furthermore also if in the case of a two-wheeled trailer, the pair of wheels and the drawbar are adapted to change places relative to the front end and the rear end of the trailer.

An effective and simple embodiment of a transmission mechanism is obtained if said mechanism comprises a transmission shaft arranged transversely to the longitudinal direction of the trailer, said shaft being adapted to be so driven from each end of the trailer by means of pair-wise intermeshing transmission wheels arranged at right angle to one another, that, irrespective of whether said transmission mechanism is driven from the front end or from the rear end of the trailer, the point of engagement of the pair of transmission wheels is located approximately diametrically relative to said transverse transmission shaft.

The transmission mechanism which converts the direction of movement into one and the same direction of rotation of the conveyor and/or the auxiliary device, when driven from either of the two ends of the driving shafts, may be constructed in various ways. It may, for example, comprise three bevel gears, one of said gears being permanently in mesh with the other two. It is likewise possible to use a worm wheel permanently in mesh with two worms.

According to another embodiment two permanently meshing gears are used, one of which is adapted to perform a revolution about the axis of the gear mounted on the transverse shaft and adapted to be coupled, in two diametrically opposite positions, with the tractor engine take-off shaft.

It is obvious that if the platform is rotatable relative to the trailer chassis, said platform should admit of being locked in a certain position. A locking device which is cheap and reliable, which properties are especially important in agricultural machines, is obtained if the position of the platform is defined by co-operating dowels and holes distributed over the platform and the undercarriage and arranged mirror-symmetrically relative to the centre of rotation.

If the position of the platform must often be changed this should admit of being effected in a simple and reliable manner by a single manipulation. This requirement is met in a preferred embodiment by making the pivot itself rotatable and by providing the same with screw thread for co-operation with a nut, either the pivot or the nut being secured from movement to the platform or to the undercarriage, the other being secured to the undercarriage or to the platform so as to be rotatable but not axially displaceable.

By way of an example an embodiment of the device according to the invention will now be described with reference to the accompanying drawings. Identical numerals relate to corresponding parts.

In said drawings:

FIG. 1 is a vertical projection of the trailer for use with a tractor, and its platform with the conveyor and the driving gear;

FIG. 2 is a side view of the trailer shown in FIG. 1 provided with a schematically drawn rotating distributor;

FIG. 3 is a vertical projection of the device after the platform has been swiveled, the discharge opening then being located on the side nearest the tractor. Furthermore the platform is now provided with an auxiliary device, in the form of a transverse conveyor;

FIG. 4 shows diagrammatically the countershaft assembly of FIGS. 1–3 on an enlarged scale;

FIG. 5 is a similar view of a modified form of gear assembly;

FIG. 6 is a diagrammatic view of another modified form of gear assembly;

FIG. 7 is a cross-sectional view and a partial elevation of a co-operating dowel and hole taken on line VII—VII in FIG. 1;

FIG. 8 is a cross-sectional view of a preferred embodiment of a lifting, swivelling and locking device for the platform.

Figure 9:
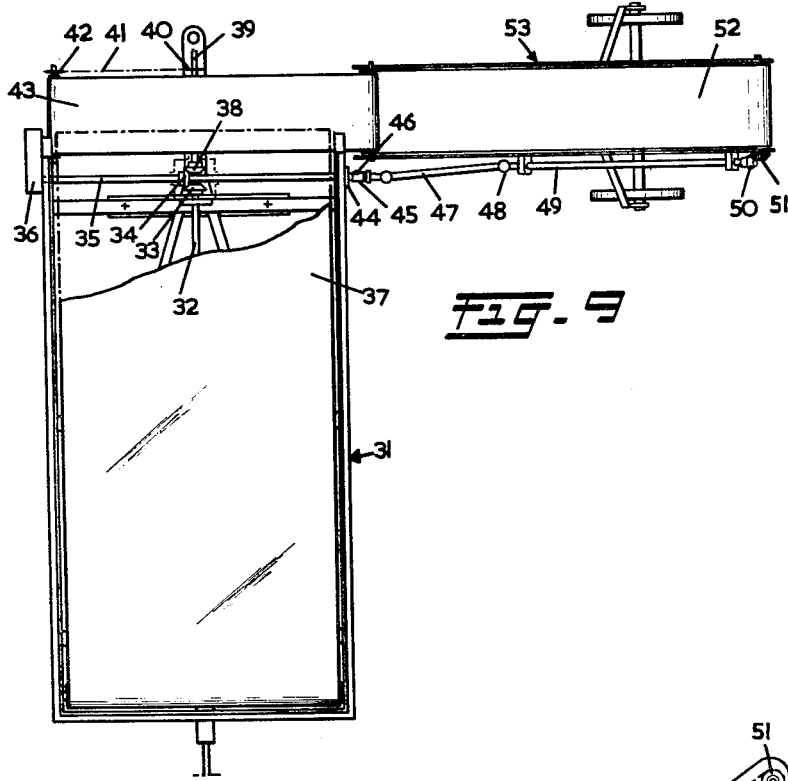
FIG. 9 is a plan view and FIG. 10 is a rear view of the device according to the invention.

The chassis of the trailer with its wheels and the draw bar is designated by the numeral 1. The platform 2 is provided with a conveyor device 3 driven by the tractor engine (not shown) via the longitudinally extending shafts 4 or 4a and the mitre gear 5 which via a transverse shaft extending therefrom drives the special driving gear 6. It will be clear, offhand, that the shafts 4 and 4a change places if the platform is swivelled in a horizontal plane through an angle of 180°. As the mitre gear 5 is so constructed that irrespective of whether the shaft 4 or the shaft 4a is driven by the tractor engine take-off shaft always the same direction of rotation relative to the platform will be imparted to the transverse output shaft leading to driving gear 6, the conveyor will always convey the material towards the end of the platform adjacent driving gear 6, when the take-off shaft rotates in one and the same direction. Various auxiliary devices may be connected to the platform, such, for example, as a transverse conveyor designated by 15, a rotatory distributor 26, etc., which may also be adapted to be driven by the tractor engine take-off shaft or in some other manner.

In FIG. 4, which shows the mitre gear 5 in more detail, the numerals 16, 17 and 18 designate mitre wheels connected to the ends of shafts 16', 4a and 4 respectively, journalled in bearings 16", 17" and 18" respectively. The gear wheel 16 is connected to the output shaft 16' leading to the driving gear 6, the gear wheels 17 and 18 are connected to the shafts 4a and 4 respectively which extend longitudinally of the trailer and which are adapted to be coupled to the tractor engine take-off shaft.

In the embodiment as shown in FIG. 5 the mitre wheel 16 is replaced by a worm gear 20 and the mitre wheels 17 and 18 respectively are replaced by the worms 21 and 22. The operation is entirely the same.

FIG. 6 shows a modified embodiment of the mitre gear 5 which comprises only two mitre wheels, the rotation, in one and the same direction, of the mitre wheel 16 and of the shaft 16' on which it is mounted, being obtained by providing shaft 17' carrying mitre wheel 17 with a coupling 23 and by mounting this whole assembly including the bearing 17", by means of a rigid member 24 about the bearing 16' as shown at 25 for swivelling movement about the shaft 16' of the gear wheel 16. In the position indicated by full lines, the gear wheel 17 is coupled to one of the two shafts extending in the longitudinal direction of the trailer. After gear wheel 17 has been rotated through 180° about the shaft of gear wheel 16 to the position as indicated by dotted lines, gear wheel 17 may be coupled to the other longitudinally extending shaft, thus making it possible for the driving to be effected from the other end of the platform without the direction of rotation of the gear 16 being reversed. Obviously the gear wheels may be mounted in an entirely closed casing, the connecting member 24 then forming an integral whole with said casing. A similar embodiment may of course be obtained by using a worm and a worm wheel.

An embodiment of one of the dowels 7 with its associated hole 8 is shown in FIG. 7, a scheme for the arrangement of, for example, four dowels being designated in FIG. 1 by the numerals 7', 8' and 7", 8" respectively, the fact being clear offhand that the dowels designated by the same numerals change places when the platform is turned through 180°. Any other number and any other arrangement of dowels and holes is possible, provided that they are arranged in mirror-symmetry with respect to the center of rotation.

In FIG. 8 numeral 9 designates a nut having an internal screw thread and secured to the platform 2. Said platform is capable of pivoting horizontally about the shaft 10 which is provided at its upper end with an external screw thread matching the screw thread in nut 9 and which rotatably bears on the under carriage 1 via a supporting ring 11 secured to the shaft 10 with the aid of a pin 12. If the shaft 10 is rotated, for example by means of a handle which is only partly shown, the platform will be raised as long as the dowels still engage their associated holes and thus prevent said platform from rotating horizontally. When the dowels disengage their associated holes the platform will rotate horizontally through 180°, whereupon the shaft is rotated in a direction opposite to the direction for raising the platform, so that said platform is lowered again and if necessary may be drawn tightly against the undercarriage.

The shaft 10 is prevented from moving upwardly by a ring 13 secured to the shaft by a pin 14.

The invention furthermore provides means for unloading material, e.g. grass, from trailers of the type in question. This must often be conveyed to a higher or a more distant location, to which end a separate conveyor may be used which is also meant to serve various other purposes.

The invention aims at providing an improvement so that said devices when used in combination will give a better performance.

This is attained according to the invention by an additional driving element connected to the transmission mechanism which is arranged at one side of the trailer adjacent the transverse conveyor for being detachably coupled to a driving means of a separate conveyor. More particularly the embodiment is of such a nature that the additional driving element comprises a shaft, one end of which is provided with keyways and with a stop groove or the like. Said measures ensure that the separate auxiliary conveyor will operate in synchronism with the transverse conveyor, so that the number of revolutions of the tractor engine may be varied according to requirements without running the risk that the auxiliary conveyor will not sufficiently carry off the material supplied which would then accumulate and fall onto the ground.

Figure 10:
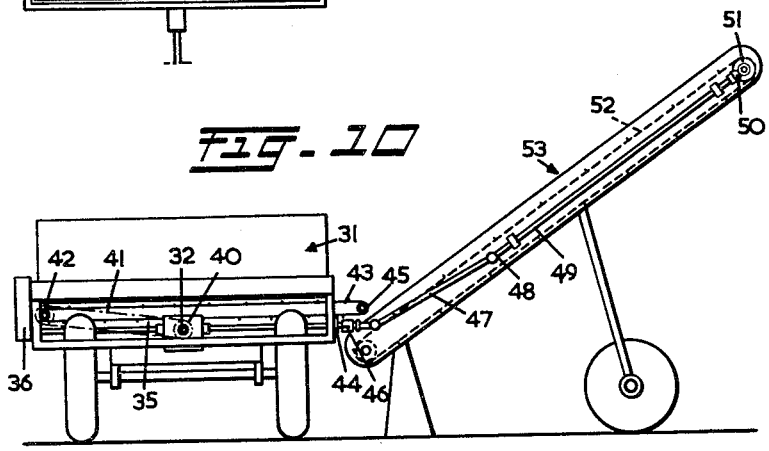

This is elucidated in FIGS. 9 and 10 of the drawings, FIG. 9 being a plan view and FIG. 10 being a rear view of this device according to the invention.

The trailer 31 comprises a shaft 32 which is adapted to be coupled to a take-off shaft of a tractor, the former shaft having at its end a mitre wheel 33 which is in mesh with the mitre wheel 34 mounted on the transverse shaft 35 which extends into a gearcase 36 for driving the endless bottom conveyor in the longitudinal direction of the platform of the trailer. The mitre wheel 34 is in mesh with the mitre wheel 38 mounted on the shaft 39 on which likewise a sprocket wheel 40 is mounted, which drives the endless transverse conveyor belt via the chain 41 and the wheel 42. The shaft 35 is also journaled at 44 in the side wall of the trailer platform. A universal joint 45 is detachably mounted on the end of the shaft 35 which extends from journal 44 and is provided with keyways, said universal joint being kept in its place by a spring-loaded pin 46. The universal joint 45 drives endless conveyor belt 52 of the auxiliary conveyor 53 via the shaft 47, a second universal joint 48, the shaft 49 and the gears 50, 51. Said auxiliary conveyor being arranged adjacent to, and except for the detachable connection 35, 45, 46, being quite unconnected with the trailer.

It is observed that the shafts 39 may also be adapted to be coupled to the take-off shaft of the tractor engine.

I claim:

1. A wheeled trailer for use with a tractor having a power take-off shaft, said trailer comprising, in combination, a chassis, a draw bar connected to said chassis, a platform mounted on said chassis, a conveyor mounted on said platform, at least one auxiliary conveying device mounted on said platform at one end thereof, a gear mechanism mounted on said platform, said gear mechanism being provided with output shaft means and input shaft means respectively extending transversely and longitudinally of said platform, said output shaft means being drivingly connected to said conveyor and to said auxiliary device, said input shaft means having coupling means for detachable connection of said input shaft means to said power-take-off shaft from either end of the trailer, said coupling means at one end of the trailer rotating reversely to the rotation of said coupling means at the other end of the trailer, with rotation of said output shaft means always in the same direction.

2. A trailer as defined in claim 1, wherein said auxiliary device is a transverse conveyor disposed at one end of said platform.

3. A trailer as defined in claim 1, wherein said platform is rotatably mounted on said chassis for rotation about a vertical axis and said platform, with said conveyor, said auxiliary device, said gear mechanism and said shaft means mounted thereon, is rotatable about said vertical axis through an angle of about 180° relative to the chassis of the trailer.

4. A trailer as defined in claim 3, wherein said chassis is supported by a pair of wheels, and said pair of wheels is disposed between the middle of said platform and the end thereof opposite said draw bar.

5. A trailer as defined in claim 1, wherein said gear mechanism comprises three bevel gears, with one of said bevel gears being permanently in mesh with the other two bevel gears.

6. A trailer as defined in claim 1, wherein said gear mechanism comprises a worm gear and two worms permanently in mesh with said worm gear.

7. A trailer as defined in claim 1, wherein said gear mechanism comprises two gear wheels permanently in mesh with each other, one of said gear wheels being mounted on said input shaft means and the other of said gear wheels being mounted on said output shaft means, said gear mechanism being mounted for swivelling movement about the axis of said output shaft means.

8. A trailer as defined in claim 3, further comprising dowels and holes associated with said platform and chassis for determining the position of said platform in relation to said chassis, said dowels and holes being distributed respectively in the platform and the chassis in a mirror-symmetrical arrangement relative to said vertical axis.

9. A trailer as defined in claim 3, wherein said vertical axis comprises a screw and a nut assembly secured to said platform and to said chassis.

References Cited in the file of this patent

UNITED STATES PATENTS

| | | |
|---|---|---|
| 1,970,627 | Rubini et al. | Aug. 21, 1934 |
| 2,488,657 | Biszantz et al. | Nov. 22, 1949 |
| 2,490,212 | Davis | Dec. 6, 1949 |
| 2,676,002 | Wolfe | Apr. 20, 1954 |
| 2,786,655 | Cowsert | Mar. 26, 1957 |
| 2,885,209 | Bruecker | May 5, 1959 |

FOREIGN PATENTS

| | | |
|---|---|---|
| 139,640 | Australia | Oct. 27, 1948 |
| 1,166,876 | France | June 30, 1958 |
| 1,181,148 | France | Jan. 5, 1959 |